US012315476B2

(12) United States Patent
du Blêt

(10) Patent No.: US 12,315,476 B2
(45) Date of Patent: May 27, 2025

(54) TAMBOURINE

(71) Applicant: Guy du Blêt, Heathmont (AU)

(72) Inventor: Guy du Blêt, Heathmont (AU)

(*) Notice: Subject to any disclaimer, the term of this patent is extended or adjusted under 35 U.S.C. 154(b) by 257 days.

(21) Appl. No.: 17/974,931

(22) Filed: Oct. 27, 2022

(65) Prior Publication Data

US 2023/0368755 A1 Nov. 16, 2023

(30) Foreign Application Priority Data

May 12, 2022 (AU) ................................ 2022901269

(51) Int. Cl.
*G10D 13/02* (2020.01)

(52) U.S. Cl.
CPC .................................... *G10D 13/02* (2013.01)

(58) Field of Classification Search
CPC ........ G10D 13/02; G10D 13/06; G10D 13/10; G10D 3/00
See application file for complete search history.

(56) References Cited

U.S. PATENT DOCUMENTS 7,714,219 B2 * 5/2010 Taninbaum ............ G10D 13/10 84/411 R
2009/0178538 A1 * 7/2009 van der Meulen .... G10D 13/06 84/418
2018/0005612 A1 * 1/2018 Finelli, III .......... F21V 33/0056

* cited by examiner

*Primary Examiner* — Kimberly R Lockett
(74) *Attorney, Agent, or Firm* — David D. Brush; Westman, Champlin & Koehler, P.A.

(57) ABSTRACT

A tambourine including a frame provided with circumferentially disposed slots and respective pairs of jingles therein. The jingles of at least one pair of jingles differ in weight from that of the jingles of at least one other pair of jingles; and/or the slots, and thus the respective jingle pairs therein, are arranged about the circumference of the frame in at least two of the following three configurations: (a) a single row configuration, wherein one or more slots are substantially aligned with a horizontal plane that bisects the frame; (b) a staggered configuration, wherein adjacent slots alternate between being above and below the plane; and (c) a stacked configuration, wherein two slots are vertically aligned with one another, with one slot being above the plane and the other being below the plane.

7 Claims, 3 Drawing Sheets

TAMBOURINE

FIELD OF THE INVENTION

Disclosed herein is a tambourine. In particular, the disclosed tambourine comprises jingles that vary in weight and/or configuration.

BACKGROUND

FIG. 1A shows an example of a known tambourine 1*a*. The tambourine 1*a* comprises a circular frame 4 and a membrane head 8 stretched thereacross. The frame 4 is formed with a plurality of generally elongate and equispaced openings or slots 10 arranged about the circumference thereof. Within each slot 10 is a respective pair of jingles 12 (also referred to as zils); the tambourine 1*a* can be played in a variety of different ways (e.g., shaking, striking, finger/thumb rolls) and at different locations to effect the clashing of the jingles in each jingle pair 12.

The tambourine 1*a* of FIG. 1A comprises slots 10 and thus jingles 12 arranged at a constant height of the frame 4 arranged about the circumference thereof. Such known tambourines 1*a* typically have jingles 12 that are all substantially identical to one another; i.e., all the jingles of a particular tambourine are formed from the same material and have the same diameter, weight, thickness, general profile etc. Moreover, since the jingles 12 are similarly arranged about the frame 4, the range of sounds that known tambourines 1*a* can produce is relatively limited. As such, musicians are required to select from a range of different tambourines with different jingle arrangements or jingle characteristics to suit the sound requirements of the particular playing conditions and requirements.

For example, with reference to FIG. 1B, which is another example of a known tambourine, tambourine 1*b* with two jingle pairs 12 arranged in a vertically stacked configuration via respective and vertically spaced apart slots 10 may be selected for its increased volume so that the tambourine 1*b* can be heard when played with a large ensemble or orchestra. In contrast, quieter tambourines with jingles arranged in a single row (such as that of FIG. 1A) may be more appropriate during the often nerve-racking conditions of a musical examination or audition (in preparation for which it is known for musicians to self-medicate to combat nerves which can translate into inadvertent hand tremors).

Jingle material and characteristics can also play a part in tambourine selection. For example, a tambourine with jingles made from German Silver may be preferred if a brilliant sound and high pitch are desired, whereas brass jingles may be preferred to achieve a more full-bodied and darker sound.

The role and musical range of tambourines are often underappreciated by the layperson. However, at higher levels of musical professionalism, greater care and attention go into tambourine selection so that the desired sounds and playability can be achieved for a particular application or performance situation. As such, a musician may need to have on hand many different tambourines from which to select, but this can be prohibitive from the perspective of cost, availability, transport and storage.

There is a need to address the above, and/or at least provide a useful alternative.

SUMMARY

According to a first aspect of the present invention, there is provided a tambourine comprising a frame provided with circumferentially disposed slots and respective pairs of jingles therein, wherein:

the jingles of at least one pair of jingles differ in weight from that of the jingles of at least one other pair of jingles; and/or the slots, and thus the respective jingle pairs therein, are arranged about the circumference of the frame in at least two of the following three configurations:

(a) a single row configuration, wherein one or more slots are substantially aligned with a horizontal plane that bisects the frame;

(b) a staggered configuration, wherein adjacent slots alternate between being above and below the plane; and (c) a stacked configuration, wherein two slots are vertically aligned with one another, with one slot being above the plane and the other being below the plane.

In certain embodiments, the tambourine comprises slots arranged in each of the three configurations. In at least one embodiment the slots are symmetrically disposed about the circumference of the frame.

It is envisaged that slots in the staggered configuration may be positioned between:

a slot in the single row configuration; and slots in the stacked configuration.

In example embodiments of the tambourine:

each jingle may have substantially the same diameter; and the jingles of at least one pair of jingles may differ in thickness from that of the jingles of at least one other pair of jingles such that said pairs of jingles differ in weight. For example, a thickness of the jingles in embodiments of the tambourine may be in the range of approximately 0.1 mm to approximately 0.8 mm.

In embodiments of the tambourine, the weights of the jingles may increase from one end of the frame to an opposite end thereof.

In at least one embodiment, the slots of the tambourine may be arranged in the following order, starting from a first end of the frame and progressing around the circumference thereof and returning toward the first end:

two slots in the single row configuration;

three slots in the staggered configuration;

three pairs of slots, each pair in the stacked configuration;

three slots in the staggered configuration; and two slots in the single row configuration.

BRIEF DESCRIPTION OF THE DRAWINGS

An embodiment of the invention will now be described, by way of example only, with reference to the accompanying drawings in which.

DETAILED DESCRIPTION

FIGS. 2A to 3B show an example of a tambourine 2 according to embodiments of the present invention. The tambourine 2 comprises a circular wooden frame 4 and a membrane-like head 8 stretched thereacross. The frame 4 extends downwardly and is formed with a plurality of generally elongate slots 10 disposed about the circumference thereof. While the term 'circumference' used herein may indeed refer to the circumference of a circle, the term should also be understood to also refer to the general perimeter, boundary or surface of a particular shape, including non-circular shapes. As such, in embodiments wherein the frame is not circular, it will be understood that the slots formed therein are similarly disposed about the perimeter thereof.

Figure 1A:
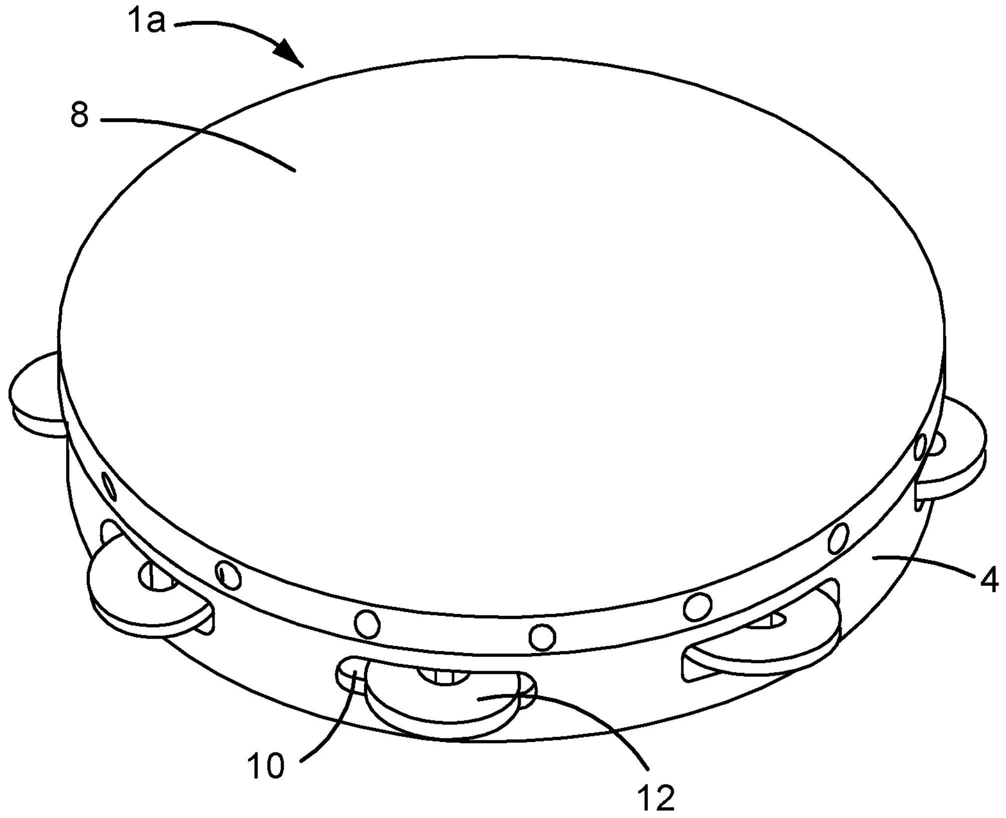
FIG. 1A is a top perspective view of a prior art tambourine wherein the slots thereof are arranged in a single row configuration.
Figure 1B:
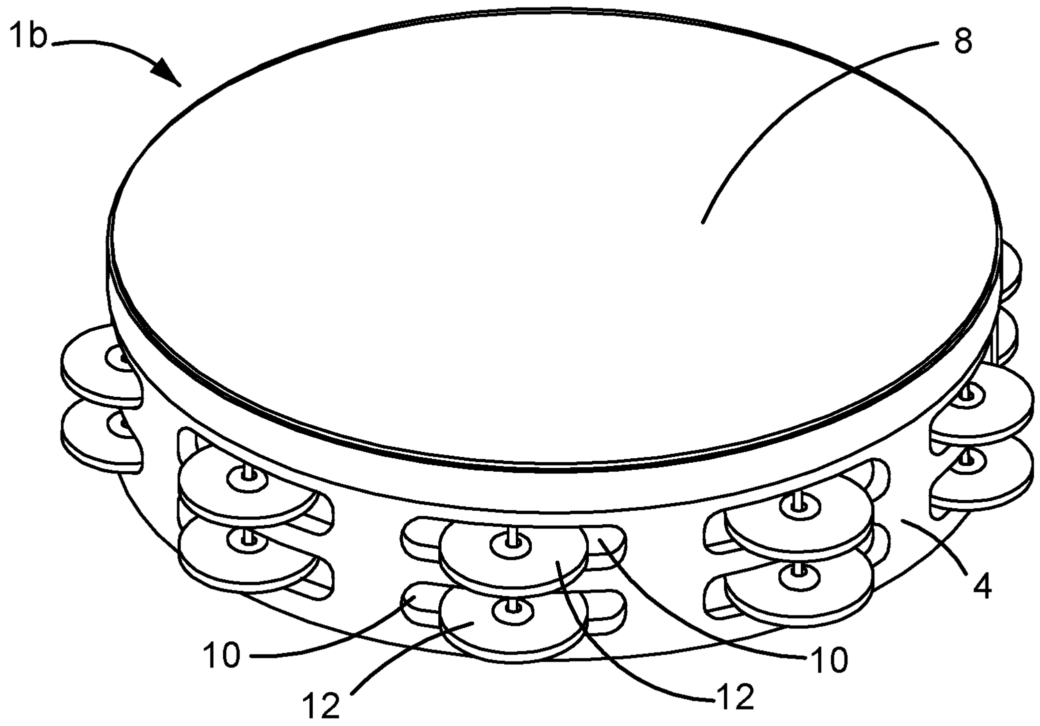
FIG. 1B is a front perspective view of another prior art tambourine wherein the slots thereof are arranged in a stacked configuration.
Figure 2A:
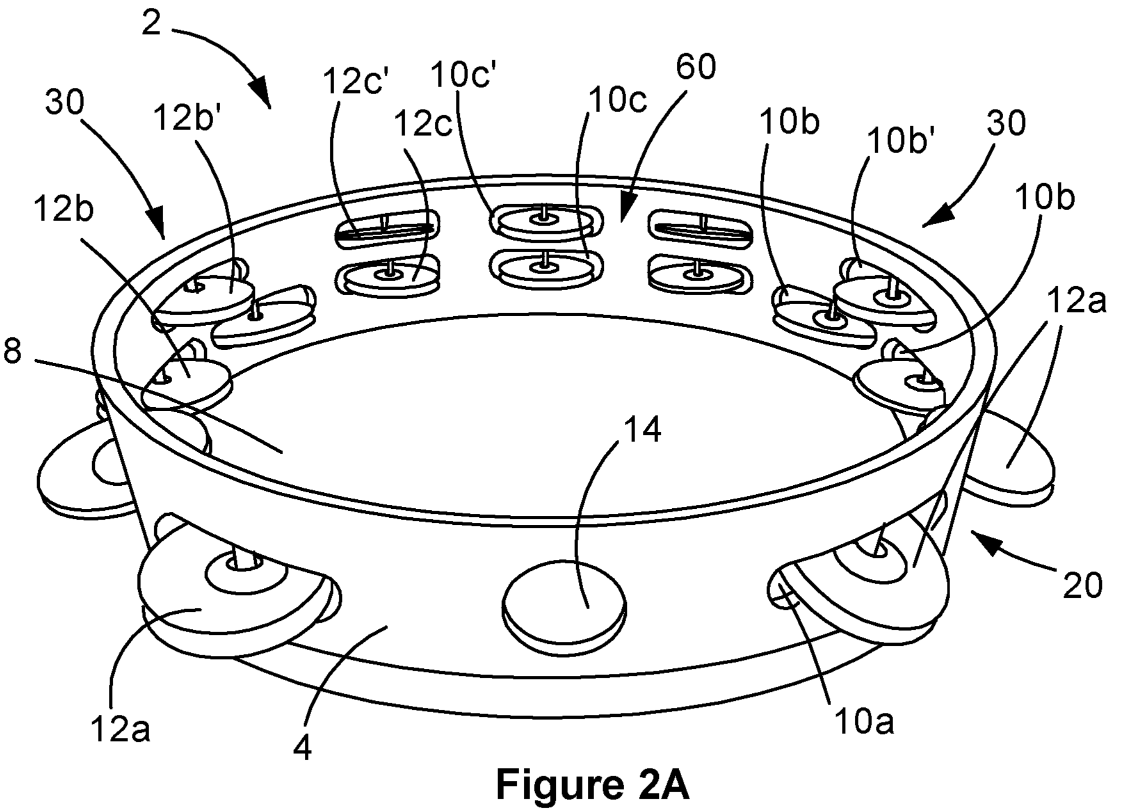
FIG. 2A is a bottom perspective view of a tambourine according to embodiments of the present invention.
Figure 2B:
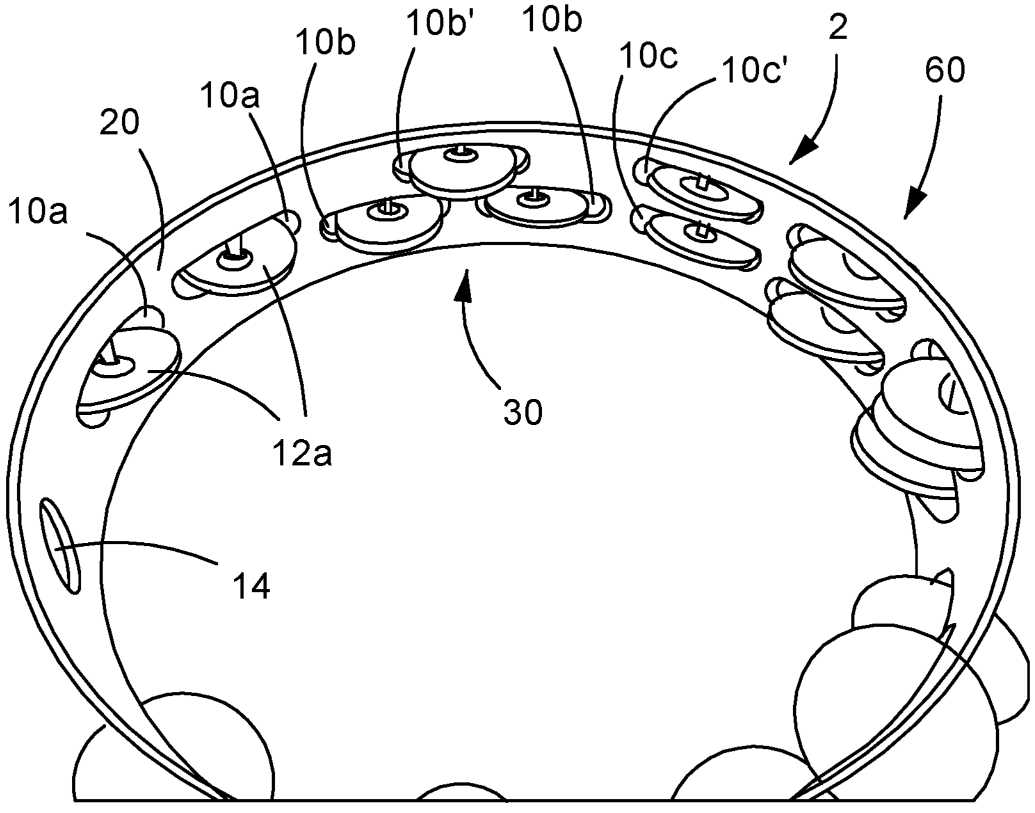
FIG. 2B is another bottom perspective view of the tambourine of FIG. 2A.

Pairs of jingles 12 are disposed in respective slots 10, each jingle pair 12 comprising first and second jingles arranged to clash against one another. Referring to FIGS. 2A and 2B, the slots 10 are arranged in a number of different configurations about the frame 4. In particular, the depicted tambourine 2 comprises slots 10, and thus respective jingles pairs 12 therein, arranged in three distinct slot configurations.

The Single Row Configuration

The first configuration 20 comprises slots 10*a* that are substantially aligned with a horizontal plane that passes through a midpoint of the height of the frame 4. In other words, it can be said that the horizontal plane generally bisects the frame 4. For example, with reference to FIG. 2B, the frame 4 has a uniform vertical height, and two of the depicted elongate slots 10*a* extend along the midpoint of the height of the frame 4. It can be said that these two slots 10*a*, and thus the respective jingle pairs 12*a* thereof, are arranged in a single row (which is also referred to herein as "the single row configuration" 20). In this way, these two slots 10*a* are aligned with and extend along a plane that is perpendicular to the vertical direction of the frame 4, which plane bisects the frame 4 (i.e., the horizontal plane is parallel to the head 8 and cuts through the circumference of the frame 4). This plane will henceforth be referred to as the "reference plane" and will be referred to in defining the positions of slots 10 in the various slot configurations of the present tambourine 2.

The Staggered Configuration

Figure 3A:
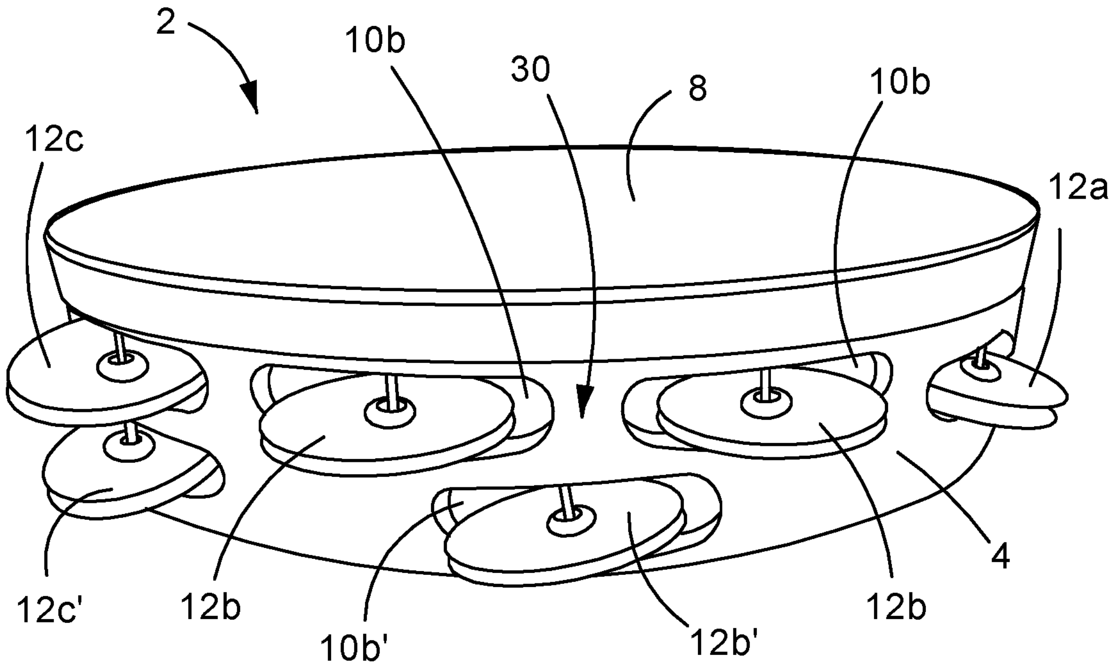
FIG. 3A is a close-up side view of the tambourine of FIG. 2A showing a staggered slot configuration thereof.
Figure 3B:
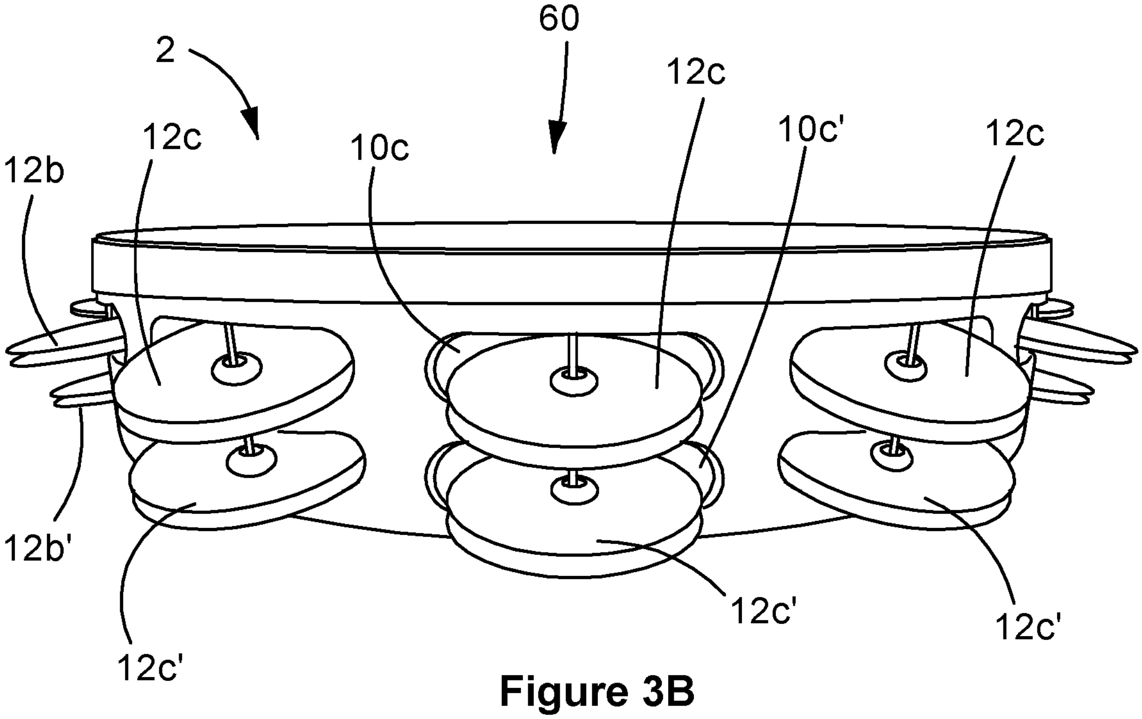
FIG. 3B is a close-up rear view of the tambourine of FIG. 2A showing a stacked slot configuration thereof.

Referring to FIGS. 2B and 3A, adjacent the two slots 10*a* in the single row configuration 20 are three slots 10*b*, 10*b'* arranged in what is referred to herein as the staggered configuration 30. In the staggered configuration 30, adjacent slots 10*b*, 10*b'* alternate between being above and below the reference plane. In the depicted example, two of the three staggered slots 10*b* are arranged above the reference plane, and thus the jingles 12*b* thereof are above the height of the jingles 12*a* in the single row configuration 20. Meanwhile, the third staggered slot 10*b'* is arranged below the reference plane, and thus the jingles 12*b'* thereof are below the height of the jingles 12*a* in the single row configuration 20. Additionally, the two slots 10*b* in the staggered configuration 30 that are at the same height are positioned closer to one another along the circumference of the frame 4, as compared with the slots 12*a* in the single row configuration 20, such that the third slot 10*b'* at least partially underlies each of the upper staggered slots 10*b*. In this way, the slots 10*b*, 10*b'* are "staggered" in that the alternating slots 10*b*, 10*b'*, and thus the jingle pairs 12*b* thereof, overlap one another in the circumferential direction along the frame 4. In other words, the staggered configuration 30 comprises slots 10*b*, 10*b'* at two different heights of the frame 4, the slots 10*b*, 10*b'* being arranged such that, in the circumferential direction of the frame 4, the slots 10*b*, 10*b'* alternate between the two different heights. In particular, adjacent slots 10*b*, 10*b'* of two different heights are circumferentially offset from one another such that, rather than being aligned above one another, they overlap so that at least a portion of a lower slot 10*b'* underlies at least a portion of an upper slot 10*b*.

The Stacked Configuration

Referring to FIG. 2A, adjacent the slots 10*b*, 10*b'* in the staggered configuration 30 are six slots 10*c*, 10*c'* arranged in is referred to herein as the stacked configuration 60. The stacked configuration 60 is similar to the staggered configuration 30 in that it also comprises slots 10*c*, 10*c'* at two different heights of the frame 4, wherein a first height is below the reference plane and a second height is above the reference plane. However, the difference is that in the stacked configuration 60, slots 10*c*, 10*c'* at the two different heights are vertically aligned with one another. In other words, the stacked configuration 60 comprises upper slots 10*c* with respective jingle pairs 12*c* and lower slots 10*c'* with respective jingle pairs 12*c'*, wherein the lower slots 10*c'* directly underlie the upper slots 10*c* and are thus vertically aligned therewith.

Referring to FIG. 2A, the slot configurations 20, 30, 60 are symmetrically disposed about the depicted tambourine 2. In particular, starting at one end of the frame 4 which may comprise an opening 14 (via which the tambourine 2 can be mounted) and progressing around the circumference of the frame 4, the tambourine 2 first comprises two slots 10*a* arranged in the single row configuration 20, then three slots 10*b*, 10*b'* arranged in the staggered configuration 30, then three pairs of slots 10*c*, 10*c'*, each pair arranged in the stacked configuration 60, wherein the central pair of slots 10*c*, 10*c'* in the stacked configuration 60 are opposite to the opening 14 of the tambourine 2. To borrow language from clock faces, the opening 14 of the tambourine 1 could be said to be located at the 6 o'clock position of the frame 4, whereas the central pair of slots of the slots 10*c*, 10*c'* in the stacked configuration would be at the 12 o'clock position of the frame 4. The tambourine 2 thus progresses symmetrically back towards the 6 o'clock position via slots 10*b*, 10*b'* arranged in the staggered configuration 20, and finally slots 10*a* arranged in the single row 20 configuration. In this way, it is possible to play or otherwise manipulate the tambourine 2 at different positions thereof to achieve different sounds and varying volumes. For example, striking the head 8 proximate to the jingles 10*b*, 10*b'* in the staggered configuration 30 will produce a quieter sound than striking the head 8 proximate to the jingles 10*c*, 10*c'* in the stacked configuration 60, and louder than that of the jingles 10*a* in the single row configuration 20. Similarly, holding the tambourine 2 in a certain position and shaking/hitting it proximate to a particular slot configuration will produce sounds different from another slot configuration, as with the starting and ending points and directionality of finger/thumb rolls along the head 8 of the tambourine 2.

Of course, the present Figures only depict one example tambourine 2. Embodiments of the present tambourine may of course have any number of different slot configurations involving two or more of the generally described three slot configurations 20, 30, 60 arranged in different orders relative to one another. In one example, one side of a tambourine might generally comprise slots 10*a* arranged in the single row configuration 20, whereas the opposite side might comprise slots 12*c*, 12*c'* arranged in the stacked configuration 60. In another example, the tambourine might comprise alternating sets of staggered and stacked slots.

While not visually depicted, another aspect of the present tambourine is that the weight of its jingles 12 need not be uniform. In particular, the tambourine 2 may comprise jingles 12 of various weights. In one example, wherein the tambourine 2 simply comprises slots 10 arranged in a single configuration (e.g., the single row configuration 20), it is envisaged that the weight of the jingles 12 proximate the aforementioned 6 o'clock position of the tambourine 2 may be lightest, wherein the weights of the jingles 12 progressively get heavier as on one travels circumferentially about the frame towards the 12 o'clock position thereof. The differently weighted jingles 12 allow the present tambourine 2 to achieve a greater dynamic range. The use of differently weighted jingles 12 on a single tambourine 2 may be analogous to using different string thicknesses in a piano or violin to achieve different notes.

Where the present tambourine 2 utilizes jingles 12 of different weights, it is envisaged that the jingles 12 would have substantially identical diameters. As such, the weight of the jingles 12 can be varied by using jingles of various thicknesses and/or materials. In one example, it is envisaged that the jingles 12 may have a thickness in the range of approximately 0.1 mm to 0.8 mm. For example, the tambourine 2 may comprise jingles 12 having two or more different weights corresponding with two or more respective jingle thicknesses. Of course, other jingle thicknesses outside of the aforementioned range are within the scope of the present specification.

The present specification encompasses tambourines 2 with any number of different slot configurations, jingle weights and jingle materials. As such, tambourines according to embodiments of the present disclosure may be configured to achieve a broader range of volumes and a higher dynamic range of sounds as compared with prior art tambourines. In this way, a single tambourine 2 according to presently disclosed embodiments is more versatile than known tambourines and may be suited for a greater range of different playing conditions and requirements.

Many modifications of the above embodiments will be apparent to those skilled in the art without departing from the scope of the present invention. For example, while the depicted tambourine comprises a head 8 that can be struck, the present teachings are similarly applicable to headless tambourines. The jingles may of course undergo heat treatment, dimpling/hammering and the like to add complexity to the sound of the tambourine. Other features of the tambourine can of course be varied to influence the sound produced thereby, including the size, thickness and material of the frame, the size of the central opening in the jingles, the bell-like profile of the jingles, the diameter of the jingles and so on. One or more aspects of the tambourine can be personalized for the specific musician/ensemble. For example, one or more jingles may be stamped with details of the player/ensemble. In one example, the first jingle adjacent to the thumb hole may be so personalized.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A tambourine comprising:

a frame provided with circumferentially disposed slots and respective pairs of jingles therein, wherein:

the jingles of at least one pair of jingles differ in weight from that of the jingles of at least one other pair of jingles; and the slots, and thus the respective jingle pairs therein, are arranged about the circumference of the frame the following three configurations:

(a) a single row configuration, wherein one or more slots are substantially aligned with a horizontal plane that bisects the frame;

(b) a staggered configuration, wherein adjacent slots alternate between being above and below the plane; and (c) a stacked configuration, wherein two slots are vertically aligned with one another, with one slot being above the plane and the other being below the plane.

2. The tambourine of claim 1, wherein the slots are symmetrically disposed about the circumference of the frame.

3. The tambourine of claim 1, wherein slots in the staggered configuration are positioned between:

a slot in the single row configuration; and slots in the stacked configuration.

4. The tambourine of claim 1, wherein:

each jingle has substantially the same diameter; and the jingles of at least one pair of jingles differ in thickness from that of the jingles of at least one other pair of jingles such that said pairs of jingles differ in weight.

5. The tambourine of claim 1, wherein a thickness of the jingles is in the range of approximately 0.1 mm to approximately 0.8 mm.

6. The tambourine of claim 1, wherein the weights of the jingles increase from one end of the frame to an opposite end thereof.

7. The tambourine of claim 1, wherein the slots of the tambourine are arranged in the following order, starting from a first end of the frame and progressing around the circumference thereof and returning toward the first end:

two slots in the single row configuration;

three slots in the staggered configuration;

three pairs of slots, each pair in the stacked configuration;

three slots in the staggered configuration; and two slots in the single row configuration.

* * * * *